(12) United States Patent
Shirai et al.

(10) Patent No.: US 10,754,453 B2
(45) Date of Patent: *Aug. 25, 2020

(54) HANDWRITING INPUT SYSTEM, BOARD, AND IDENTIFICATION COMPONENT

(71) Applicant: SHARP KABUSHIKI KAISHA, Sakai, Osaka (JP)

(72) Inventors: Katsunori Shirai, Sakai (JP); Sachio Tanaka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 61 days.

This patent is subject to a terminal disclaimer.

(21) Appl. No.: 16/048,070

(22) Filed: Jul. 27, 2018

(65) Prior Publication Data
US 2019/0033991 A1  Jan. 31, 2019

(30) Foreign Application Priority Data

Jul. 31, 2017 (JP) .................................. 2017-148271

(51) Int. Cl.
| | |
|---|---|
| *G06F 3/038* | (2013.01) |
| *G06F 3/041* | (2006.01) |
| *G06F 3/044* | (2006.01) |
| *G06F 3/0354* | (2013.01) |
| *B43L 1/00* | (2006.01) |

(52) U.S. Cl.
CPC .............. *G06F 3/0383* (2013.01); *B43L 1/00* (2013.01); *G06F 3/03545* (2013.01); *G06F 3/044* (2013.01); *G06F 3/0416* (2013.01)

(58) Field of Classification Search
None
See application file for complete search history.

(56) References Cited

U.S. PATENT DOCUMENTS

| | | | | |
|---|---|---|---|---|
| 2013/0300712 | A1* | 11/2013 | Kim ....................... | G06F 3/0416 345/174 |
| 2015/0286298 | A1* | 10/2015 | Lee ....................... | G06F 3/0488 345/179 |
| 2016/0209944 | A1* | 7/2016 | Shim ..................... | G06F 3/0383 |
| 2018/0246587 | A1* | 8/2018 | Dekel ................... | G06F 3/0383 |

FOREIGN PATENT DOCUMENTS

| | | |
|---|---|---|
| JP | 4799013 B2 | 10/2011 |
| JP | 2015-041318 A | 3/2015 |

* cited by examiner

*Primary Examiner* — Matthew Yeung
(74) *Attorney, Agent, or Firm* — ScienBiziP, P.C.

(57) ABSTRACT

A handwriting input system includes a board for writing and a pen that serves as a writing instrument. The pen includes a pen tip that leaves visible handwriting on the board when the pen tip comes into contact with the board and an identification circuit that provides an identification signal. The board includes a coordinate detection section that detects position coordinates of a position on the board where the pen tip is in contact with the board and a pen identification section that detects the identification signal in a contactless manner.

6 Claims, 12 Drawing Sheets

FIG. 6A

| IDENTIFICATION COMPONENT TYPE | $f_0$ (kHz) | WRITING COLOR |
|---|---|---|
| ID1 | 100 | BLACK |
| ID2 | 120 | BLUE |
| ID3 | 140 | GREEN |
| ID4 | 160 | YELLOW |
| ID5 | 180 | ORANGE |
| ID6 | 200 | RED |

FIG. 6B

| IDENTIFICATION COMPONENT TYPE | $f_0$ (kHz) | WRITING COLOR | PEN TIP SIZE | PEN TIP SHAPE |
|---|---|---|---|---|
| ID-a | 100 | BLACK | FINE | ● |
| ID-b | 105 | BLACK | FINE | ■ |
| ID-c | 110 | BLACK | THICK | ● |
| ID-d | 115 | BLACK | THICK | ■ |
| ID-e | 120 | BLUE | FINE | ● |
| ID-f | 125 | BLUE | FINE | ■ |
| ID-g | 130 | BLUE | THICK | ● |
| ID-h | 135 | BLUE | THICK | ■ |
| ID-i | 140 | GREEN | FINE | ● |
| ⋮ | ⋮ | ⋮ | ⋮ | ⋮ |
| ID-u | 215 | RED | THICK | ● |

$$f_o = \frac{1}{2\pi LC}$$

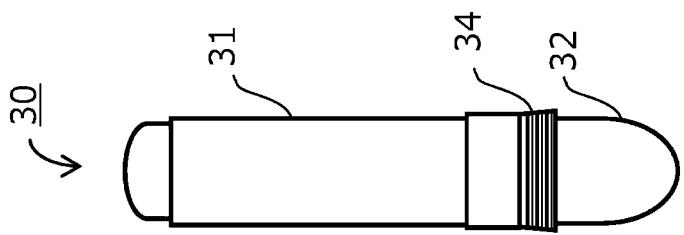
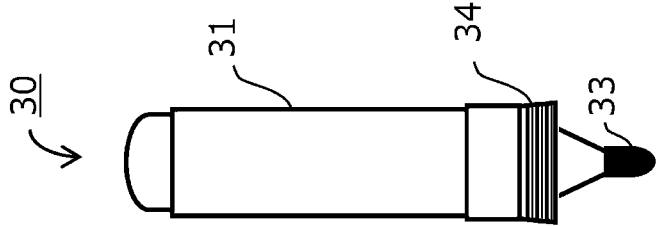
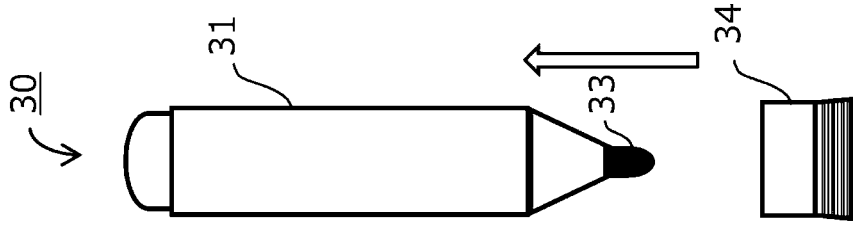
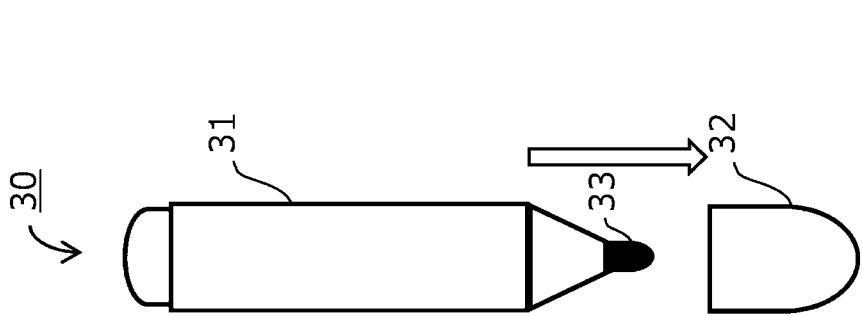
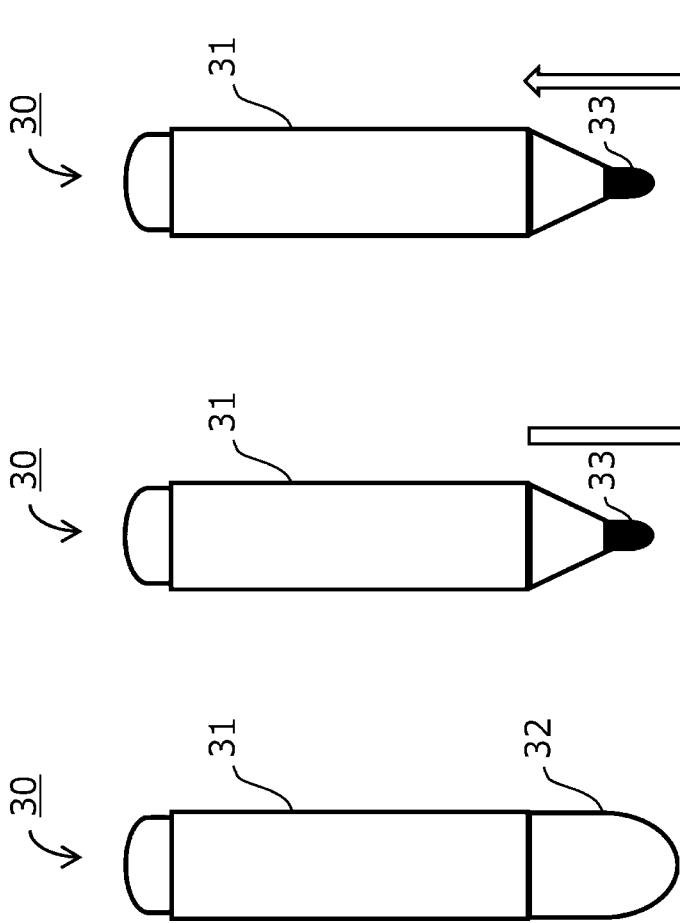

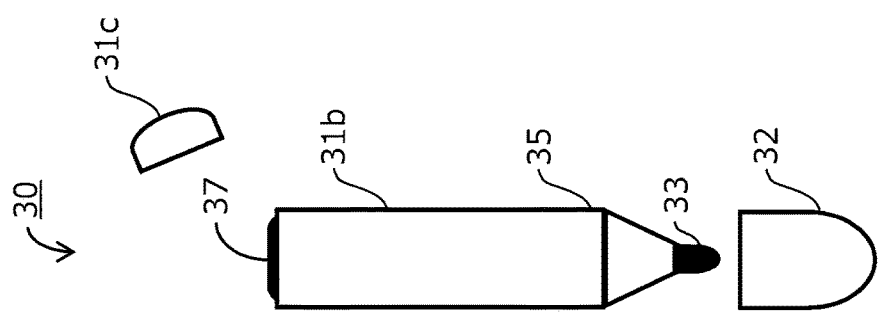
FIG. 10C
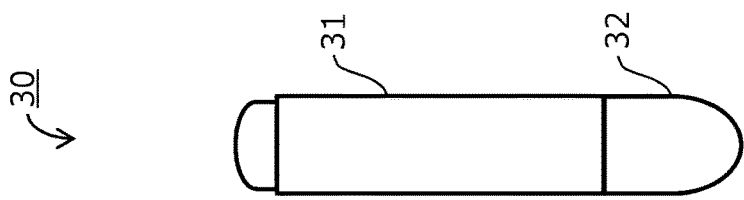
FIG. 10B
FIG. 10A

HANDWRITING INPUT SYSTEM, BOARD, AND IDENTIFICATION COMPONENT

BACKGROUND

1. Field

The present disclosure relates to a handwriting input system, a board, and an identification component.

2. Description of the Related Art

Taking the place of a conventional blackboard and a conventional whiteboard without hard copy functionality, a device capable of outputting a hard copy of handwritten content by mechanically scanning a blackboard or a whiteboard has become widespread and is referred to as an electronic blackboard or an electronic whiteboard (hereinafter in this specification referred to as an electronic whiteboard). For such a scanning-type electronic whiteboard, a configuration in which the scanning time is reduced and a moving portion for scanning is eliminated with the aim of improving reliability is desired. As an implementation of such a configuration, an electronic whiteboard using a large display with a touch panel (a display-type electronic whiteboard) was proposed and is now commercially available. The display-type electronic whiteboard has, in addition to the function of producing a hard copy of the scanning-type electronic whiteboard, a function of displaying content based on form data, document data, or image data on a screen. The display-type electronic whiteboard receives the handwriting that is input via the screen by using an electronic pen or the like, displays the handwritten content on the screen, and outputs a hard copy of the handwritten content on the screen. The display-type electronic whiteboard further provides a function that cannot be implemented by the scanning-type electronic whiteboard, which is, for example, that at an electronic meeting, a camera image showing the other party at a remote location is displayed on the screen together with meeting material, and the handwriting on the displayed meeting material or a space for providing memos is shared with the other party in almost real time. As the display-type electronic whiteboard is used mainly for handwriting, however, it is not often necessary to display content based on data on the screen. Even if it is not necessary to display content based on data on the screen, the display-type electronic whiteboard still has an advantage that cannot be achieved by a scanning-type electronic whiteboard. The display-type electronic whiteboard detects, by using a touch panel, the handwriting that is input via the screen by using an electronic pen, immediately converts into data the handwritten content corresponding to the detected handwriting that has been input, and displays on the screen the handwritten content based on the data; in other words, the handwriting input and the acquisition of the data of the handwriting are performed simultaneously. Various technologies for detecting handwriting input have been developed. For example, there has been proposed a coordinate detection apparatus capable of detecting both a pen and a ringer as pointers by employing both a capacitance system that easily accomplishes multi-touch detection and an electromagnetic induction system that achieves high detection resolution (see, for example, Japanese Unexamined Patent Application Publication No. 2015-41318).

Even if it is used mainly for handwriting, the display-type electronic whiteboard has the advantage that the handwriting can be immediately converted into data, which cannot be implemented by the scanning-type electronic whiteboard. Nevertheless, since the display-type electronic whiteboard utilizes a display, the display-type electronic whiteboard has a more complex configuration than that of the scanning-type electronic whiteboard and also has an increased cost because it typically uses a large display. Therefore, a technology having both a function of immediately converting the handwriting into data and a simple configuration is desired. In addition, although various attempts have been made to reduce discomfort, the display-type electronic whiteboard differs from the conventional whiteboard in tactile sensation of writing, responsiveness, and operations of writing and deletion. For users used to a conventional whiteboard, less discomfort when writing is desirable. In consideration of the circumstances described above, the present disclosure provides a handwriting input system that immediately detects handwriting while providing the same mechanism for writing and the same presentation as those of a conventional whiteboard.

SUMMARY

According to an aspect of the disclosure, the present disclosure provides a handwriting input system including a board for writing and a pen that serves as a writing instrument. The pen includes a pen tip that leaves visible handwriting on the board when the pen tip comes into contact with the board and an identification circuit that provides an identification signal. The board includes a coordinate detection section that detects position coordinates of a position on the board where the pen tip is in contact with the board and a pen identification section that detects the identification signal in a contactless manner.

According to another aspect of the disclosure, the present disclosure provides a board for writing including a coordinate detection section that detects position coordinates of a position on the board where a pen tip is in contact with the board and a pen identification section that detects an identification signal in a contactless manner. Writing is per on the board by using a pen including a pen tip that leaves visible handwriting on the board and an identification circuit that provides the identification signal.

According to a further aspect of the disclosure, the present disclosure provides an identification component including an identification circuit that generates an identification signal. The identification component is attached to a pen as a writing instrument and provides the identification signal. The pen includes a pen tip that leaves visible handwriting on a board. The board includes a pen identification section that detects the identification signal in a contactless manner and a coordinate detection section that detects position coordinates of a position on the board where the pen tip is in contact with the board.

BRIEF DESCRIPTION OF THE DRAWINGS

FIGS. 6A and 6B are tables illustrating examples of definitions in which a resonant frequency $f_0$ and attributes of a pea are associated with each other in accordance with this embodiment;

FIGS. 8A to 8E illustrate examples of an exterior of the pen according to the first embodiment;

FIGS. 10A, 10B, and 10C illustrate modes of a pen different from the modes illustrated in FIGS. 8A to 8E, 9A, and 9B;

DESCRIPTION OF THE EMBODIMENTS

The present disclosure will be further described in detail below with reference to the drawings. The following descriptions are considered in all respects as illustrative and not restrictive.

First Embodiment

<<Configuration of Handwriting Input System>>

Figure 1:
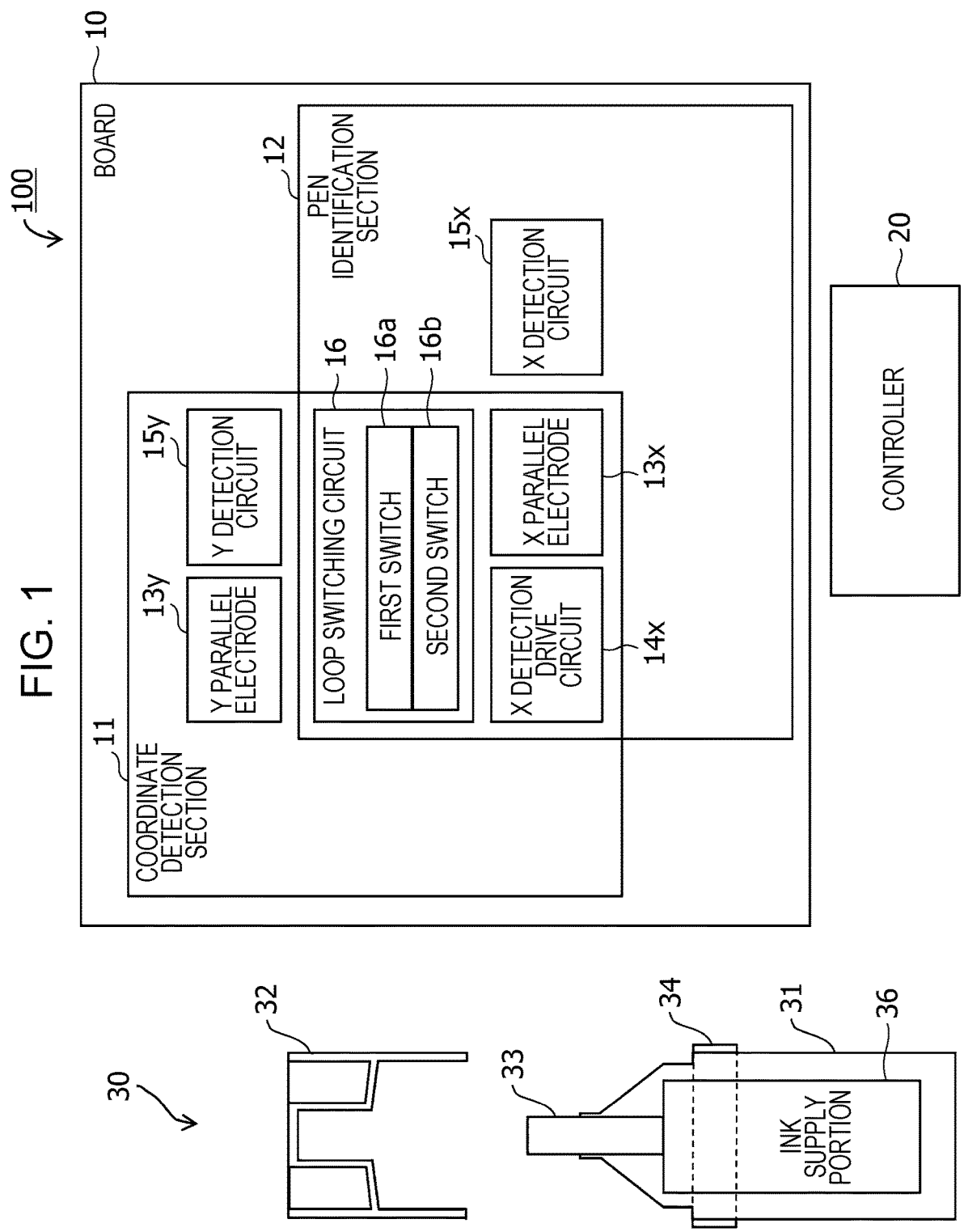
FIG. 1 illustrates an example of a configuration of a handwriting input system according to the present disclosure.
Figure 2:
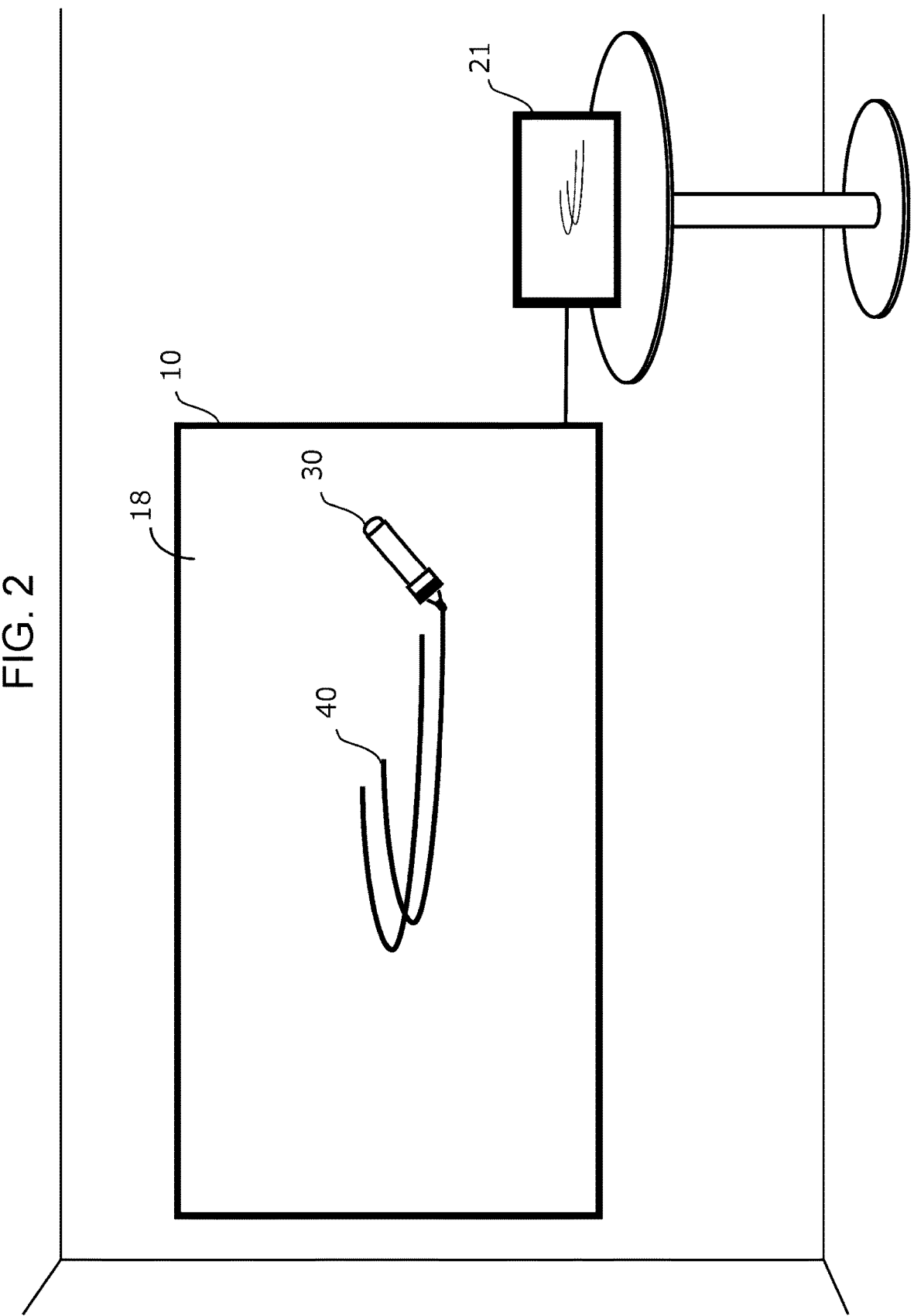
FIG. 2 illustrates an example in which the handwriting input system illustrated in FIG. 1 is in use.
Figure 3:
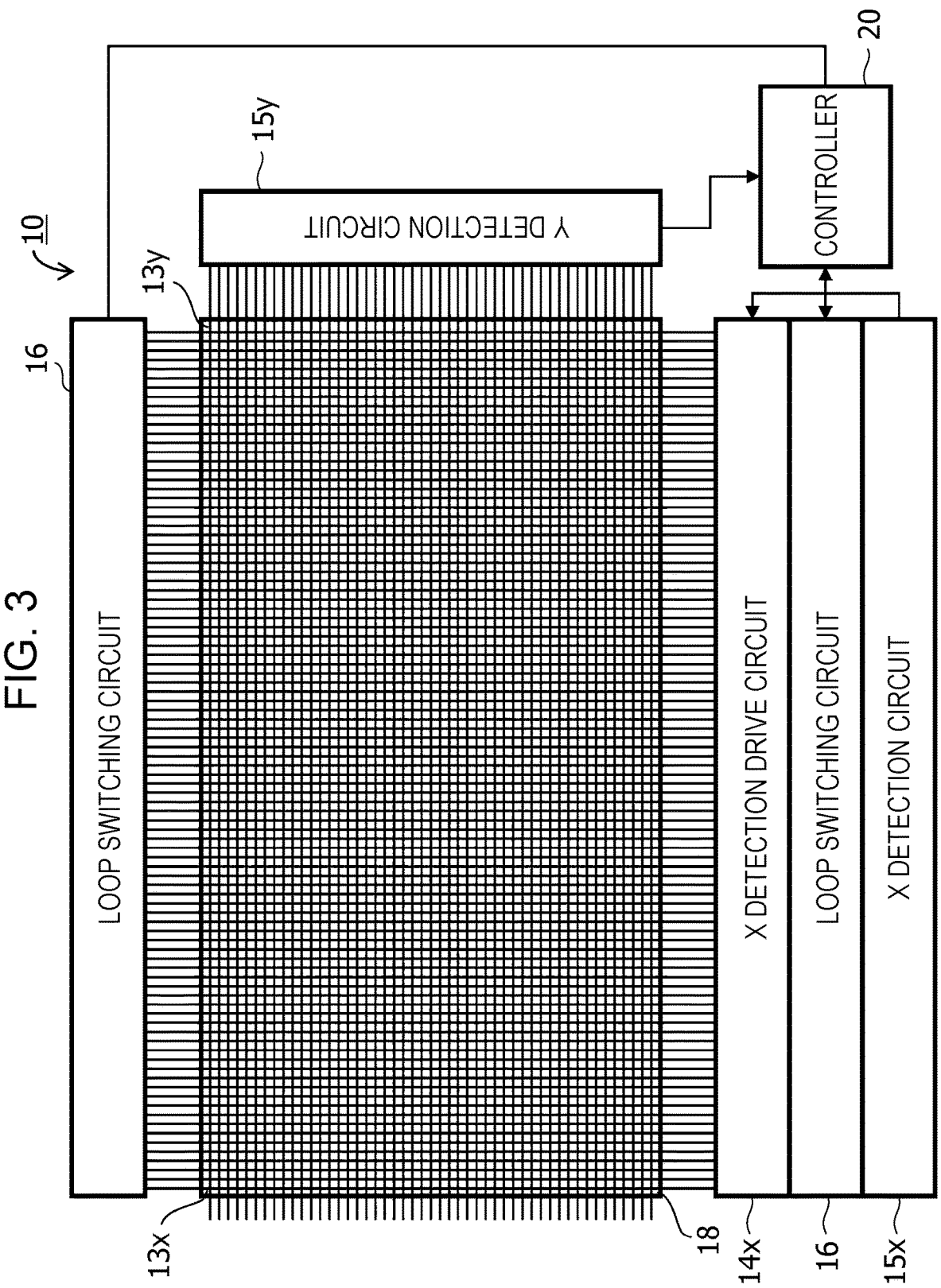
FIG. 3 illustrates a configuration of a board illustrated in FIG. 1, particularly an arrangement of an X parallel electrode and a Y parallel electrode.
Figure 4:
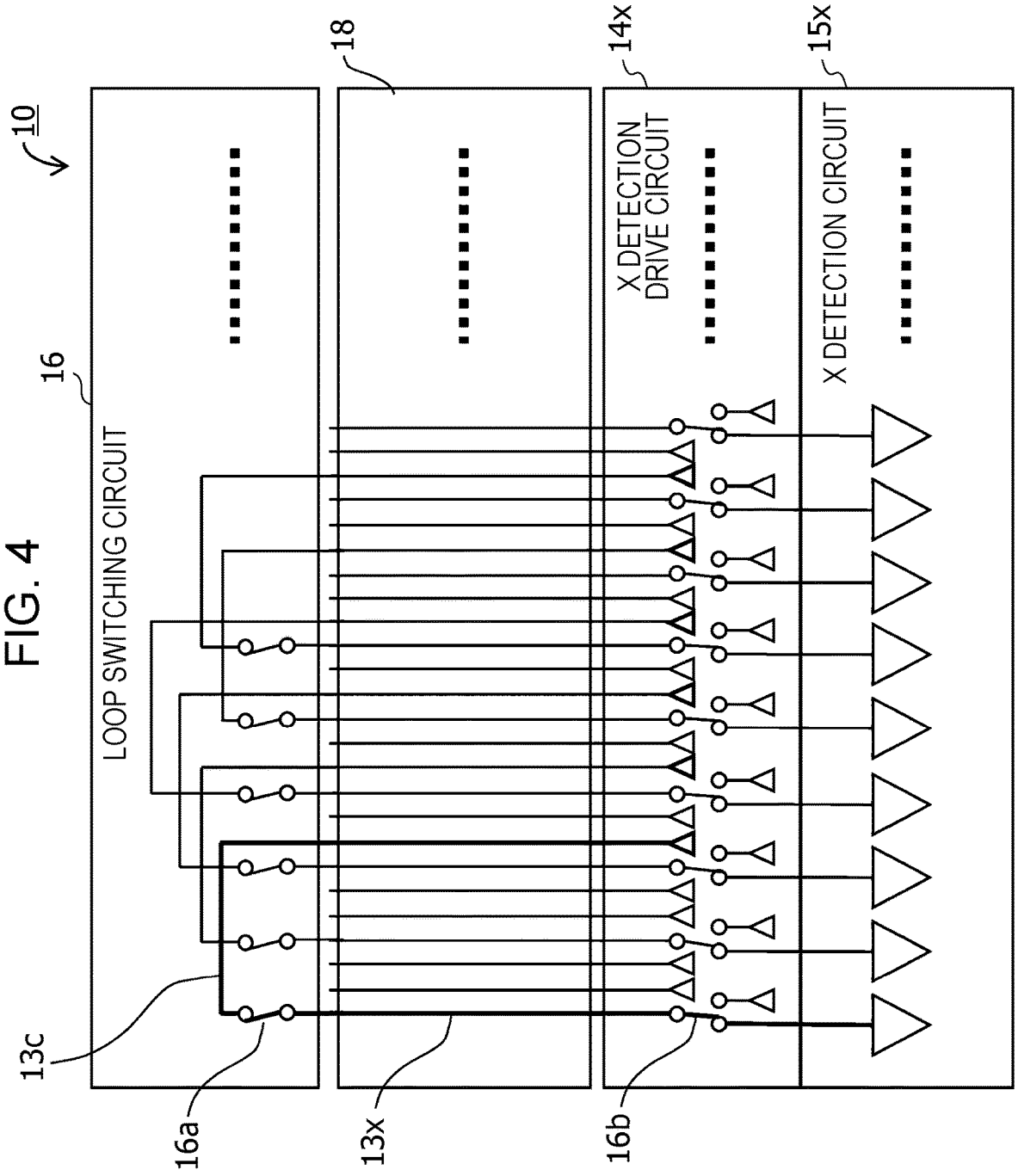
FIG. 4 is a diagram for describing a function of a loop switching circuit of the board illustrated in FIG. 1.
Figure 5:
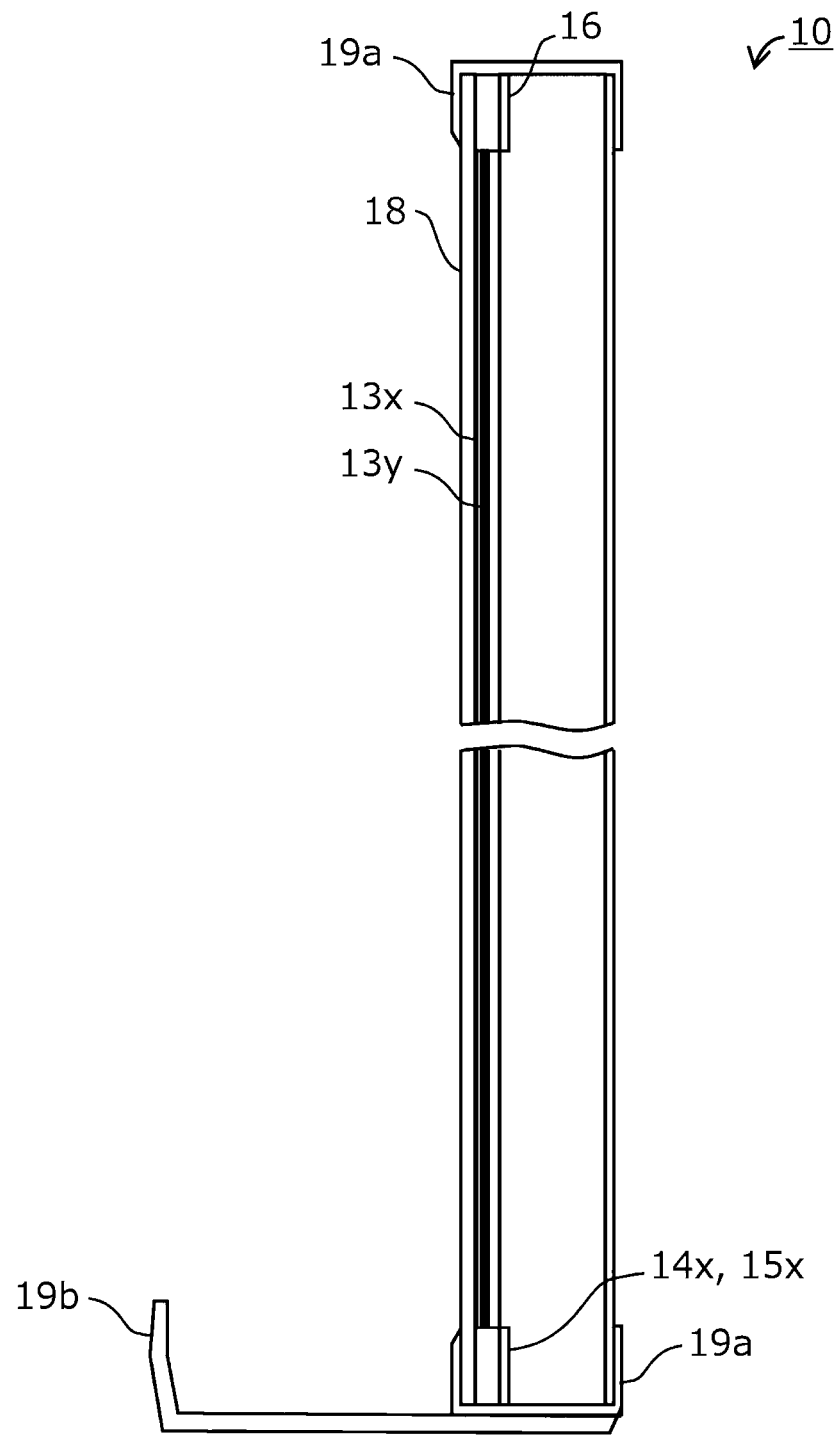
FIG. 5 is a sectional view of a configuration in a vertical direction of the board illustrated in FIG. 1.

FIG. 1 illustrates an example configuration of a handwriting input system according to the present disclosure. FIG. 2 illustrates an example in which the handwriting input system illustrated in FIG. 1 is in use. FIG. 3 illustrates a configuration of a board 10 illustrated in FIG. 1, particularly an arrangement of an X parallel electrode and a Y parallel electrode. FIG. 4 is a diagram for describing a function of a loop switching circuit of the board 10 illustrated in FIG. 1. FIG. 5 is a sectional view of a configuration in a vertical direction of the board 10 illustrated in FIG. 1.

A handwriting input system 100 illustrated in FIG. 1 is composed mainly of a pen 30 and the board 10. The pen 30 includes a pen body 31, a cap 32, a pen tip 33, an identification component 34, and an ink supply portion 36. The pen 30 is illustrated in FIG. 1 in a manner in which the shape of the pen 30 can be viewed. The identification component 34 includes an identification circuit, which is not illustrated in FIG. 1. The cap 32, which is attachable to and detachable from the pen body 31, covers the pen tip 33 when attached to the pen body 31 so as to not expose the pen tip 33.

In this embodiment, the pen tip 33 is made of felt impregnated with ink. This structure is generally known as a structure of a marker pen for a white board. When the point of the pen tip 33 that is exposed by removing the cap 32 comes into contact with a writable area 18 of the board 10, ink adheres to the contact position and leaves handwriting on the board 10 (see FIG. 2). The end of the pen tip 33 opposite to the point is in contact with the ink supply portion 36 storing ink, and ink is supplied from the ink supply portion 36 to the pen tip 33 by capillary action. The identification component 34 is attached around the periphery of the pen body 31 close to the position where the cap 32 is attached. As mentioned above, the identification component 34 includes the identification circuit, which is not illustrated in FIG. 1. In one specific example of a configuration of the identification circuit, the identification circuit is an AC resonant circuit consisting of an inductance component A and a capacitor component C.

In this embodiment, the writable area 18 of the board 10 is formed such that handwriting produced by using the pen 30 remains on the writable area 18 of the board 10. Furthermore, it is preferable that the handwriting can be deleted. The board 10 may be disposable if the board 10 is made inexpensively, but the board 10 is preferably made such that the writing can be deleted to enable the board 10 to be written on repeatedly. Referring to FIG. 5, the periphery of the board 10 is covered by a peripheral member 19a to improve the board's strength. The writable area 18 is on the front surface of the board 10 covered by the peripheral member 19a at its periphery. A pen holder 19b is disposed at the lower end of the board 10. If the pen 30 is a marker pen, the corresponding writable area 18 has a surface similar to a marker board. As illustrated in FIG. 1, when divided by main function, the board 10 has a coordinate detection section 11 and a pen identification section 12. The coordinate detection section 11 detects the coordinates of a position where the pen tip 33 of the pen 30 comes into contact with the board 10. The pen identification section 12 detects an identification signal transmitted from the identification component 34 attached to the pen 30. In one configuration example that implements these functions, the coordinate detection section 11 of this embodiment operates as a capacitance-type touch panel. Furthermore, the pen identification section 12 operates as an electromagnetic induction circuit and detects the identification signal transmitted from the identification component 34.

The coordinate detection section 11 is constituted by Y parallel electrode 13y, a Y detection circuit 15y, an X parallel electrode 13x, an X detection drive circuit 14x and a loop switching circuit 16. Among these, the X parallel electrode 13x and the X detection drive circuit 14x of the coordinate detection section 11 shares hardware devices with those of the pen identification section 12. The loop switching circuit 16 switches a loop between the case where the shared hardware devices are used for the coordinate detection section 11 and the case where the shared hardware devices are used for the pen identification section 12. The pen identification section 12 includes the X parallel electrode 13x and the X detection drive circuit 14x, which are shared with the coordinate detection section 11, the loop switching circuit 16 for switching the loop, and additionally, an X detection circuit 15x. The X parallel electrode 13x is constituted by multiple electrodes that are embedded close to the surface of the board 10 on which writing is performed by using the pen 30. The multiple electrodes are arrayed in an X direction (horizontal direction), and each extends in a Y direction (vertical direction) (see FIG. 3).

Similarly, the Y parallel electrode 13y is constituted by multiple electrodes that are embedded close to the surface of the board 10 on which writing is performed by using the pen 30. The multiple electrodes are arrayed in the Y direction (vertical direction), and each extends in the X direction (horizontal direction) (see FIG. 3). The multiple electrodes of the Y parallel electrode 13y are embedded at a depth different from the depth at which the multiple electrodes of the X parallel electrode 13x are embedded. Accordingly, the multiple electrodes of the Y parallel electrode 13y cross the multiple electrodes of the X parallel electrode 13x with an insulating layer of a given thickness interposed between them, and thus the Y parallel electrode 13y and the X parallel electrode 13*x* do not come into contact with each other (see FIG. 5). It is noted that, regarding the material for the surface of the board 10 constituting the writable area 18, an aluminum plate, which electrically shields the X parallel electrode 13*x* and the Y parallel electrode 13*y* embedded close to the surface of the board 10, and a steel plate, which magnetically shields the X parallel electrode 13*x* and the Y parallel electrode 13*y*, are not suitable. Rather, a resin material such as a melamine coated epoxy resin material or a polycarbonate resin material, for example, is applicable.

As illustrated in FIG. 3, the X detection drive circuit 14*x* is connected to one end of the X parallel electrode 13*x* and applies a given voltage to each of the multiple electrodes. The voltage may vary between the case where the X detection drive circuit 14*x* functions as part of the coordinate detection section 11 and the case where the X detection drive circuit 14*x* functions as part of the pen identification section 12. The voltage is, for example, applied sequentially as an impulse-like voltage from the left-side electrode to the right-side electrode.

The Y detection circuit 15*y* detects the amount of voltage or current that is induced in each electrode of the Y parallel electrode 13*y* by being driven by the X detection drive circuit 14*x*. With regard to the amount of voltage or current, the amount of coupling capacitance between the electrodes of the X parallel electrode 13*x* and the electrodes of the Y parallel electrode 3*y* differs between the case where a dielectric or a metal object is in contact with a portion that affects the amount of coupling capacitance, that is, a portion of the board underneath which the X parallel electrode 13*x* crosses the Y parallel electrode 13*y*, and the case where a dielectric or a metal object is not in contact with the portion. For example, the coupling capacitance increases when the pen tip 33 impregnated with ink, or a human finger, comes into contact with the board, because these are dielectric objects. Therefore, by detecting the change of coupling capacitance, the coordinates of a position where the pen tip 33 or a human finger is in contact with the board 10 can be detected. This is known as the operation of the capacitance-type touch panel. Since the amount of coupling capacitance typically varies between a human finger and the pen tip 33, whether a human finger or the pen tip 33 is being used can be determined by using not only the detected coordinates of a contact position but also the difference in the amount of coupling capacitance.

As illustrated in FIG. 4, the loop switching circuit 16 includes a first switch 16*a* for switching a loop to or not to connect two electrodes of the multiple electrodes of the X parallel electrode 13*x* at one electrode side, two electrodes being spaced at a given distance from each other. Coupling a pair of electrodes on one electrode side by using the first switch 16*a* forms a U-shaped current path. The U-shaped current path functions as an induction coil of the pen identification section 12. A second switch 16*b* is disposed at one end of the U-shaped current path. The second switch 16*b* operates synchronously with the first switch 16*a*. In a state where the first switch 16*a* disconnects a pair of electrodes from each other, the second switch 16*b* couples one electrode of the pair to the X detection drive circuit 14*x*. Conversely, in a state where the first switch 16*a* connects a pair of electrodes with each other, the second switch 16*b* couples one electrode of the pair to the X detection circuit 15*x*. As a result, when a pair of electrodes are disconnected from each other, each electrode is driven by the corresponding X detection drive circuit 14*x*. By contrast, when a pair of electrodes is connected to each other and a U-shaped current path is formed as an induction coil, the second switch 16*b* couples one electrode of the U-shaped current path to the X detection circuit 15*x*. The other electrode of the U-shaped current path is not coupled to a switch and is driven by the X detection drive circuit 14*x*.

In this embodiment, multiple U-shaped current paths serving as induction coils are arrayed in the X direction (horizontal direction). When the loop switching circuit 16 causes the X parallel electrode 13*x* to operate for the pen identification section 12, for example, the multiple induction coils are driven sequentially from the left side to the right side. In FIG. 4, to show that only the left side induction coil is driven, an induction coil 13*c* on the left side is illustrated with a thicker line than the lines of other induction coils. While changing the driving frequency, the X detection drive circuit 14*x* drives the other end of the induction coil 13*c* as a U-shaped current path. The X detection circuit 15*x* that is connected to one end of the induction coil 13*c* detects the amount of current that corresponds to the frequency and that flows in the induction coil 13*c*. Subsequently, the same detection is performed for the induction coil to the right of the induction coil 13*c* and proceeds sequentially to the right-side induction coil. The loop switching circuit 16 is necessary for sharing the X parallel electrode 13*x* between the coordinate detection section 11 and the pen identification section 12.

When the identification component 34 is near an induction coil driven at a driving frequency corresponding to the resonant frequency of the identification component 34, a large resonant current flows in a resonance circuit due to electromagnetic coupling with the induction coil. Consequently, a large current flows in the induction coil. By detecting the amount of the current in the X detection circuit 15*x*, it can be detected that the identification component 34 of what resonant frequency exists in which area in the X direction.

In this embodiment, the resonant frequency of the identification component 34 is predetermined in association with attributes of the pen 30. FIGS. 6A and 6B are tables illustrating examples of definitions in which a resonant frequency $f_0$ and the attributes of the pen 30 are associated with each other in accordance with this embodiment. A list illustrated in FIG. 6A shows an example in which the resonant frequency $f_0$ of the identification component 34 is associated with the ink color of the pen (the writing color). Different resonant frequencies $f_0$ are determined for pens of different colors: black, blue, green, yellow, orange, and red. In accordance with the writing color of the pen, a user attaches the identification component 34 that has the resonant frequency $f_0$ associated with the writing color.

A list illustrated in FIG. 6B shows an example in which not only the writing color of the pen 30 but also the attributes such as the pen tip size and the shape of the pen tip are determined in association with the resonant frequency $f_0$ corresponding to respective combinations of these attributes. By predetermining the unique resonant frequency $f_0$ corresponding to a single combination of multiple kinds of attributes as illustrated in the list in FIG. 6B, multiple kinds of attributes associated with the detected resonant frequency $f_0$ can be obtained.

When the coordinate detection section 11 detects the position coordinates of the pen tip 33 in the area where the pen identification section 12 detects the existence of the identification component 34, handwriting data according to the position coordinates and the attributes of the pen corresponding to the identification information can be generated. The handwriting data may be generated by, for example, causing a personal computer to execute a dedicated processing program in accordance with the information detected by the coordinate detection section 11 and the pen identification section 12. Alternatively, by incorporating a microcomputer on the board 10, not only the processing performed by the coordinate detection section 11 and the pen identification section 12 but also the processing for generating the handwriting data may be performed by the microcomputer.

FIG. 1, a controller 20 represents a section that performs processing for generating handwriting data. The controller 20 is constituted mainly by a central processing unit (CPU) or a microcomputer and also by peripheral circuits such as a timer and an input/output circuit and memory. The controller 20 may be separated from the board 10 or integrated onto the board 10, that is, incorporated onto the board 10; in other words, the controller 20 may perform processing outside the handwriting input system according to this embodiment or may be included in the handwriting input system. In the former case, the handwriting input system detects handwriting and provides data as the basis for generating handwriting data. In the latter case, the handwriting input system further carries out the processing for generating handwriting data.

When the processing of the handwriting input system according to this embodiment includes the generation of handwriting data, for example, device 21 may be connected to the controller 20 as illustrated in FIG. 2 and the contend based on the generated handwriting data may be displayed in real time. Needless to say, even if the content based on the handwriting data is not displayed on the display device 21, handwriting 40 written by using the pen 30 remains on the writable area 18 of the board 10. The display device 21 is effective in checking that the handwriting data generated by the controller 20 is identical to the handwriting 40 in the writable area 18. The handwriting data reflects the attributes of the pen 30. For example, cording to the definition illustrated in FIG. 6A, the writing color of the handwriting data displayed on the display device 21 coincides with the writing color of the handwriting 40. Furthermore, according to the definition illustrated in FIG. 6B, the thickness and the shape of the line of the displayed handwriting data reflects the size and the shape of the pen tip 33. If a hard copy of the handwriting data is printed by a color printer (not illustrated), the obtained hard copy reflects the writing color or the pen point size and shape in addition to the writing color.

<<Configuration Examples of Pen and Identification Circuit>>

Figure 7A:
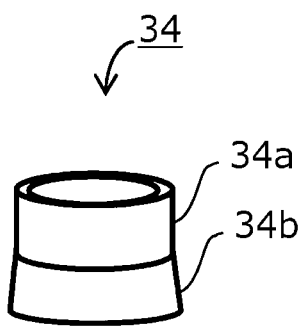
FIG. 7A illustrates the exterior of an identification component including an identification circuit according to a first embodiment.
Figure 7B:
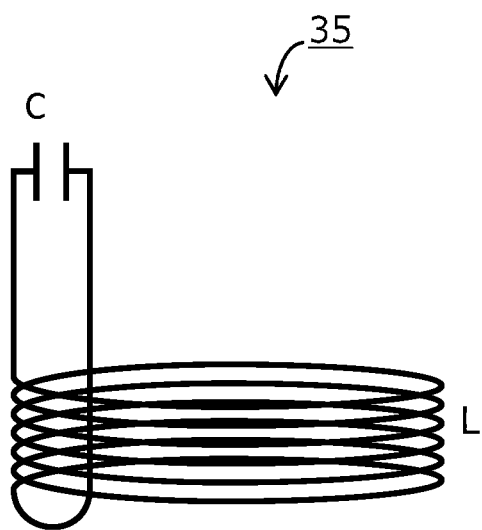
FIG. 7B illustrates a resonance circuit that serves as the identification circuit according to the first embodiment.

Next, configurations of the pen 30 and an identification circuit according to this embodiment is further described in detail. FIG. 7A illustrates the exterior of the identification component 34 including an identification circuit according to this embodiment. FIG. 7B illustrates a resonance circuit 35 that serves as the identification circuit. FIGS. 8A to 8E illustrate examples of an exterior of the pen 30 according to this embodiment, especially examples of a mode of attaching the identification component 34 to the pen body 31.

As illustrated in FIG. 7A, the identification component 34 of this embodiment is thin and formed in a substantially cylindrical shape, including a fixing portion 34a on the upper side and an identification circuit portion 34b on the lower side. The fixing portion 34a has such a size that the outer surface of the pen body 31 firmly fits into the inner surface of the fixing portion 34a. It is preferable that a member made of a material having elasticity, such as rubber or polyurethane resin, be disposed on the inner surface of the fixing portion 34a, so that the identification component 34 can be attached and fixed to the pen body 31 even if the outside diameter of the pen body 31 varies. In the identification circuit portion 34b, the resonance circuit 35 is accommodated. FIG. 7B illustrates a configuration of the resonance circuit 35. As illustrated in FIG. 7B, the resonance circuit 35 is constituted by an inductance L and a capacitor C. An LC resonant circuit as illustrated in FIG. 7B can be obtained by, for example, forming a circuit pattern by using a conductor on a film-like insulator, such as a flexible substrate, and connecting both ends of the insulator to form a ring. Alternatively, the LC resonant circuit may be obtained by covering a thin conductive wire wound in a coil shape with a resin and coupling both ends of the conductive wire to a capacitor.

The resonance circuit 35 having a different resonant frequency $f_0$ can be obtained by changing at least one of the magnitude of the inductance L and the magnitude of the capacitor C. As a result, identification components corresponding to respective multiple resonant frequencies $f_0$ can be obtained as illustrated in FIG. 6. FIGS. 8A and 8B illustrate examples of an exterior of the pen 30. FIG. 8A illustrates the state where the cap 32 is fitted on the pen body 31, and FIG. 8B illustrates the state where the cap 32 is removed from the pen body 31. In this embodiment, the pen body 31 and the cap 32 may be of a commercially available marker pen.

As illustrated in FIG. 8C, the cap 32 is removed and the identification component 34 is inserted from the side of the pen tip 33. As illustrated in FIG. 8D, the pen 30 is used in a state where the identification component 34 is fitted close to the pen tip 33 of the pen body 31. Hence, the pen 30 according to this embodiment can be implemented by even a commercially available marker pen to which the identification component 34 is attached. It is preferable that the identification component 34 be attached to the pen body 31 at such a position close to the pen tip 33 that the cap 32 is neatly fitted to the pen body 31 while the identification component 34 is fitted to the pen body 31 as illustrated in FIG. 8E. Furthermore, it is preferable that the identification component 34 be attached to the pen body 31 in a state where the identification circuit portion 34b is closer to the pen tip 33 than the fixing portion 34a.

Second Embodiment

Figure 9B:
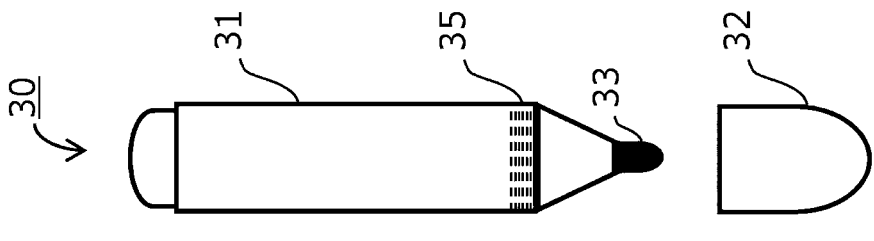
FIGS. 9A and 9B illustrate modes of a pen different from the mode illustrated in FIGS. 8A to 8E.
Figure 9A:
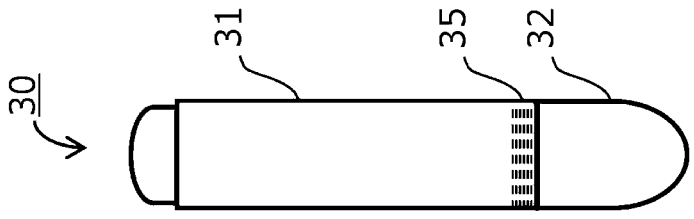

The pen 30 may be a commercially available marker pen to which the identification component 34 is attached in the first embodiment. This embodiment describes different modes of the pen 30. FIGS. 9A, 9B, 10A to 10C illustrate modes of the pen 30 different from the mode illustrated in FIGS. 8A to 8E. The pen 30 illustrated in FIGS. 9A and 9B show examples of a mode in which the resonance circuit 35 as the identification circuit is incorporated in the pen body 31. It is noted that FIG. 9A corresponds to FIG. 8A and FIG. 9B corresponds to FIG. 8B.

As illustrated in FIGS. 9A and 9B, the resonance circuit 35 is incorporated in the pen body 31 at a position close to the pen tip 33. With this mode, since the identification circuit corresponding to the attributes of the pen 30 is incorporated in the pen 30 when a user obtains the pen 30, the user does not need to attach the identification component 34 to the pen 30. Furthermore, the user does not need to consider the correspondence between the attributes of the pen and the identification component 34 to be attached.

Differently from FIGS. 8A to 8E, 9A and 9B, FIGS. 10A to 10C illustrate examples of a mode in which the resonance circuit 35 is attached to a pen refill. FIG. 10A corresponds to FIG. 8A, FIG. 10B corresponds to FIG. 8B, and FIG. 10C illustrates a pen refill 37. As illustrated in FIG. 10B, the pen refill 37 can be replaced by removing a sealing plug 31c from an outer cylinder portion 31b of the pen body 31 and removing the pen refill 37. The sealing plug 31c is attached to the opposite end of the outer cylinder portion 31b to the pen tip 33. As illustrated in FIG. 10C, the pen refill 37 includes the pen tip 33, the resonance circuit 35 as the identification circuit, and the ink supply portion 36.

With this mode, since the pen refill 37 as a consumable item includes portions relating to the attributes of the pen and the identification circuit corresponding to the attributes is incorporated in the pen refill 37, a user does not need to attach the identification component 34 to the pen 30. Furthermore, the user does not need to consider the correspondence between the attributes of the pen and the identification component 34 to be attached. Moreover, since the resonance circuit 35 can be disposed closer to the point of the pen tip 33 while not restricted by attaching and detaching of the cap 32 as in the mode illustrated in FIG. 8, a stronger electromagnetic coupling with an induction coil can be achieved.

Third Embodiment

The modes illustrated in FIGS. 8A to 8E, 9A, 9B, and 10A to 10C are formed on the basis that the pen body 31 or the pen refill 37 includes the identification circuit corresponding to the attributes of the pen 30. The pen 30 is a marker pen in the above description, but it is not an essential requirement. The pen 30 may preferably be a writing instrument that leaves erasable handwriting on the board 10, for example, a ballpoint pen with erasable ink. At least a portion of the tip of the ballpoint pen is formed of a metal object. By designing a capacitance-type touch panel to suit the characteristics of the pen tip, position coordinates of the pen tip can be detected by the coordinate detection section 11. The writable area 18 of the board 10 on which writing is performed by using the pen 30 as a writing instrument does not need to be a marker board. For example, when the pen 30 is a ballpoint pen, the writable area 18 may be made of a material suitable for writing with a ballpoint pen. Moreover, the board 10 is not limited to a board-like structure having high stiffness, and may be, for example, a sheet-like structure.

Fourth Embodiment

In the description of the first and second embodiments, the identification circuit is an LC resonant circuit. However, the identification circuit is not limited to an LC resonant circuit, and may be implemented as a different mode. For example, instead of a resonance circuit, a system employing a radio-frequency identification (RFID) technology may be applied for the identification circuit. RFID is a technology for reading data stored in an integrated circuit (IC) chip referred to as a radio frequency (RFID) tag in a contactless manner by using a radio wave. The identification component 34, the pen body 31, or the pen refill 37 may include an RF tag instead of the resonance circuit 35 illustrated in FIGS. 8A to 8E, 9A, 9B, and 10A to 10C, and the pen identification section 12 of the board 10 may be a circuit for reading the RF tag. In such a case, the RF tag stores, instead of the resonant frequency $f_0$ of the resonance circuit 35, information of a predetermined value corresponding to the attributes of the pen.

Fifth Embodiment

In the description of the above-described embodiments, it is preferable that the handwriting be erasable. In this embodiment, the synchronization between the erase operation for the handwriting and the handwriting data is described. For example, it is assumed that the pen 30 is a writing instrument similar to a marker pen and the writable area 18 correspondingly has a surface similar to that of a marker board. As the eraser for conventional whiteboards, an elastic member made of a material such as urethane with a raised fiber surface covering around it is typically used. Wiping the handwriting in the writable area 18 by using an eraser made of a material similar to that of a marker pen removes the handwriting. The handwriting on the writable area 18 can be erased by using such a conventional eraser, but the handwriting data cannot be updated synchronously with the erase operation for the handwriting. To synchronize the erase operation with the handwriting data, it is necessary to use an eraser whose position coordinates can be detected by the coordinate detection section 11.

Figure 11A:
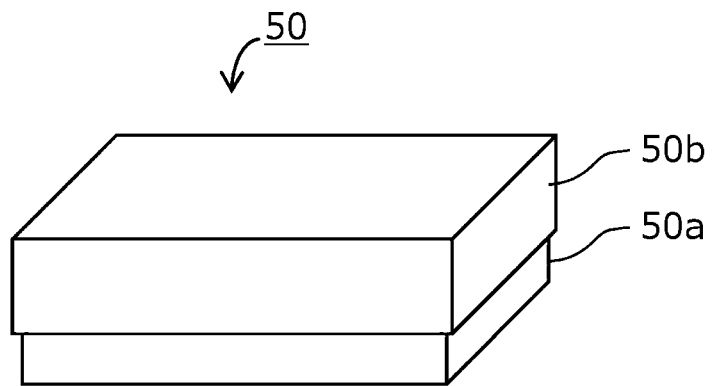
FIGS. 11A to 11C illustrate a configuration of an eraser according to a fifth embodiment.
Figure 11B:
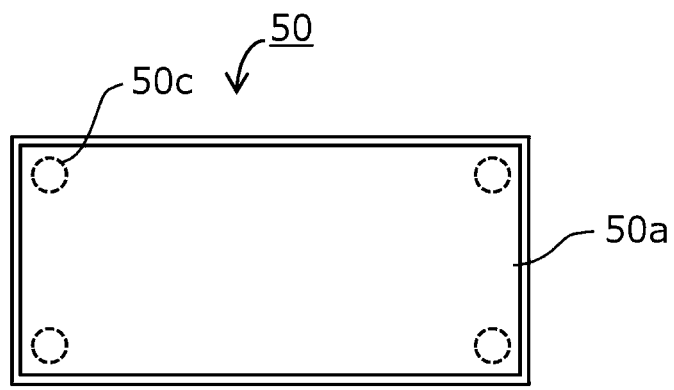
Figure 11C:
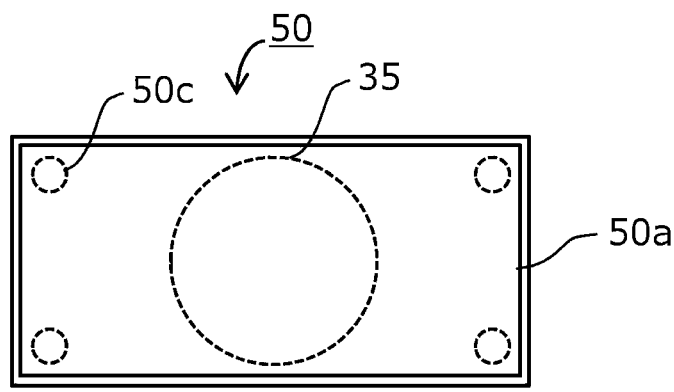

FIGS. 11A to 11C illustrate a configuration of an eraser according to this embodiment. As illustrated in FIG. 11A, an eraser 50 has an erase portion 50a and a holding portion 50b. The erase portion 50a is formed such that a raised fiber surface covers an elastic member in a cuboid shape as the core member. Its exterior and the material of the surface are the same as those of the eraser for conventional whiteboards.

The eraser according to this embodiment differs from the conventional eraser in that a dielectric 50c that can be detected by the coordinate detection section 11 is disposed at least each of the four corners of the core member on the lower surface of the erase portion 50a (see FIG. 11B). The dielectrics 50c are disposed such that, when the lower surface of the eraser 50 is in contact with the board 10, the coordinate detection section 11 detects each of the positions of the four corners of the erase portion 50a. A metal object may be used instead of the dielectric if the coordinate detection section 11 can detect the metal object.

Because the capacitance-type touch panel enables multitouch detection, the positions of the dielectrics 50c disposed at the four corners of the eraser 50 can be detected. For example, in a case where the coordinate detection section 11 simultaneously detects position coordinates of four positions in an area with a predetermined size, it may be determined that the detection result indicates not the pen 30 nor a finger but the eraser 50. In such a manner, the eraser 50 can be distinguished from the pen 30 and a finger. In a case where the eraser 50 is recognized and it is detected that the positions of four dielectrics moves on the board, the handwriting data within the area where a rectangular region moves is erased, where the rectangular region is obtained by connecting the position coordinates of the four dielectrics with straight lines. With this processing, synchronously with the erase operation for the handwriting in the writable area 18, the corresponding portion of the handwriting data can be deleted. As illustrated in FIG. 11C, the resonance circuit 35 as the identification circuit may be disposed on the elastic member of the eraser 50 in addition to the dielectric 50c. Since an unique transmission frequency $f_0$ is assigned to the eraser 50, the eraser 50 can be reliably distinguished from the pen 30 and a finger by using an identification signal.

When the conventional whiteboard is used, users often wipe the whiteboard with a finger without using an eraser to erase the handwriting. This is because erasing with a finger is easier when erasing a small area. In this embodiment, because the coordinate detection section 11 is a capacitance-type touch panel, the contact of a finger as a dielectric can be detected. Furthermore, in accordance with the amount of capacitance, a finger and the pen 30 can be distinguished from each other. Similarly, a finger and the eraser 50 can be distinguished from each other. As a result, synchronously with the operation for erasing the handwriting by using a finger, a corresponding portion of the handwriting data can be deleted.

Sixth Embodiment

As a modified example of the configuration of the board 10 described in the first embodiment, a mode in which an induction coil is provided in addition to the X parallel electrode 13x may be considered. In this case, the loop switching circuit 16 described in the first embodiment is unnecessary, and the X parallel electrode 13x and the X detection drive circuit 14x are used only for the coordinate detection section 11. Without using them, an electrode as an induction coil and a drive circuit are added as components for the pen is section 12. The detection of the induction coil is performed by the X detection circuit 15x described in the first embodiment. The induction coil according to this embodiment is embedded at a depth different from those of both the X parallel electrode 13x and the Y parallel electrode 13y. Hence, the induction coil is out of contact with the X parallel electrode 13x and the Y parallel electrode 13y.

Seventh Embodiment

This embodiment describes the processing for generating and updating the handwriting data performed by the controller 20 in a case where the controller 20 is included in the handwriting input system. It is noted that the same processing for generating and updating the handwriting data is performed even in a case where the controller 20 exists outside the system.

Figure 12:
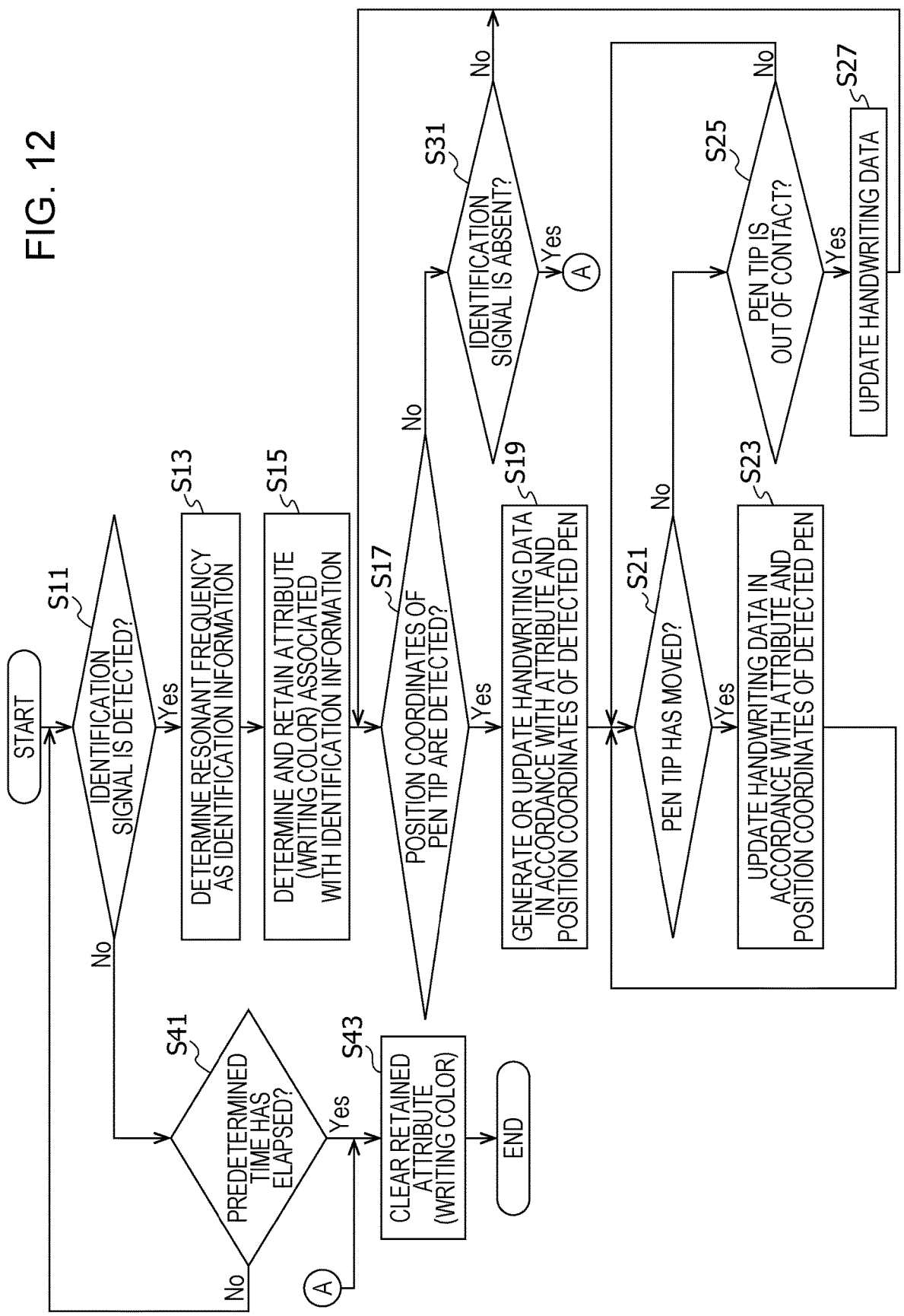
FIG. 12 is a flowchart illustrating processing for generating and updating handwriting data performed by a controller according to a seventh embodiment.

FIG. 12 is a flowchart illustrating the processing for generating and updating the handwriting data performed by the controller 20 according to this embodiment. The processing illustrated in FIG. 12 is performed in parallel with other tasks in the multitasking environment. In addition, after a series of processing operations for the task is completed, the task starts again. After the task starts processing, the controller 20 observes the detection of an identification signal performed by the pen identification section 12 and the detection of position coordinates performed by the coordinate detection section 11 and performs processing according to those detections. For ease of understanding. FIG. 12 illustrates only the processing relating to writing and omits the processing relating to the erase operation of the handwriting. Those skilled in the art would easily understand the erase processing in accordance with the processing for writing illustrated in FIG. 12 and the description of the fifth embodiment.

First, the controller 20 determines whether an identification signal is detected by the pen identification section 12 (step S11). In a case where an identification signal is detected (Yes in step S11), the identification information associated with the identification signal is obtained (step S13). More specifically, when the identification circuit is the resonance circuit 35 as described in the first embodiment, the pen identification section 12 drives an induction coil at different drive frequencies and determines that which frequency causes resonance. The determination processing is sequentially performed for each induction coil. When it is determined that resonance occurs in an induction coil, in other words, when an identification signal is detected, it is determined that the pen 30 exist near the area where the induction coil exists. The driving frequency at which the resonance occurs, that is, the resonant frequency $f_0$ is obtained as the identification information.

Here, since the coordinate detection section 11 as a capacitance-type touch panel can detect multi-touch input, even if multiple persons write at different positions of the writable area 18 at the same time, the coordinate detection section 11 can detect each writing. To respond to the multi-touch detection function of the coordinate detection section 11, the pen identification section 12 is formed such that multiple induction coils are arrayed at different positions in the X direction (horizontal direction). The approximate position of the pen 30 in the X direction can be determined by which induction coil detects an identification signal.

According to the configuration of the first embodiment illustrated in FIGS. 1, 3, and 4, the pen identification section 12 can detect a position in the X direction but cannot detect a position in the Y direction. However, if the board 10 can be hung on a wall as illustrated in FIG. 2, when multiple persons write on the board 10 at the same time, writing is performed at different positions in the X direction. Therefore, detecting positions in the X direction is sufficient. The pen identification section 12 may be configured to also detect a position in the Y direction by adding circuits corresponding to the loop switching circuit 16, the X detection drive circuit 14x, and the X detection circuit 15x, which are illustrated in FIG. 3, for the Y direction.

Returning to the description of the flowchart, the controller 20 obtains the attributes of the pen 30 defined in association with the resonant frequency as illustrated in FIGS. 6A and 6B. While the identification signal is being detected, a memory retains the data of the attributes (step S15). The controller 20 then determines whether the coordinate detection section 11 detects position coordinates of the pen tip 33 (step S17). In a case where the position coordinates of the pen tip 33 are detected (Yes in step S17), the handwriting data is generated in accordance with the detected position coordinates of the pen and the attributes whose data is retained in the memory. Otherwise the generated handwriting data is updated (step S19).

Subsequently, the controller 20 determines whether the position coordinates of the pen tip 33 have moved (step S21). In a case where the pen tip 33 has moved (Yes in step S21), the handwriting data is updated in accordance with the position coordinates of the pen after moved and the attributes whose data is retained in the memory (step S23). The routine then returns to above-described step S21, and the controller 20 monitors the movement of the pen tip 33. Conversely, in a case where it is determined in above-described step S21 that the pen tip 33 has not moved (No in step S21), the controller 20 further determines whether the pen tip 33 is out of contact with the board 10 (step S25).

In a case where the pen tip 33 is in contact with the board 10 (No in step S25), the routine returns to above-described step S21 and the controller 20 monitors the movement of the pen tip 33. By contrast, in a case where the pen tip 33 is out of contact with the board 10 (Yes in step S25), the controller 20 updates the handwriting data (step S27). The routine then returns to above-described step S17, and the controller 20 monitors whether a new position of the pen tip 33 is detected. In a case where the position coordinates of the pen tip 33 are not detected (No in step S17), the controller 20 determines whether the identification signal detected in step S11 is absent (step S31).

In a case where the identification signal remains to be detected (No in step S31), the routine returns step S17 and waits for the detection of position coordinates of the pen tip 33. Conversely, in a case where the detected identification signal is absent at the time (Yes in step S31), the routine proceeds to step S43 and the data of the attributes (for example, the writing color) of the pen 30 having been retained in the memory while the identification signal is being detected is cleared. The processing subsequently ends. After the processing ends, the task restarts repeatedly, and the detection of an identification signal continues successively.

In a case where any identification signal is not detected (No in step S11), the routine proceeds to step S41 and it is determined whether a predetermined time elapsed while any identification signal is not detected. In a case where the predetermined time has not elapsed. (No in step S41), the routine returns to step S11 and waits for the subsequent detection of an identification signal. In a case where the predetermined time has elapsed (Yes in step S41), the routine proceeds to step S43 and if an identification signal has been detected by then and the data of the attributes (for example, the writing color) of the pen 30 is retained in the memory, the data of the attributes is cleared. The processing subsequently ends. Since the task restarts repeatedly, the detection of an identification signal continues successively. The processing for generating and updating the handwriting data performed by the controller 20 is as described above.

As described above, (i) the handwriting input system according to the present disclosure includes a board for writing and a pen that serves as a writing instrument. The pen includes a pen tip that leaves visible handwriting on the board when the pen tip comes into contact with the board and an identification circuit that provides an identification signal. The board includes a coordinate detection section that detects position coordinates of a position on the board where the pen tip is in contact with the board and a pen identification section that detects the identification signal in a contactless manner. The board of the handwriting input system according to the present disclosure is for writing performed by using a pen. It is preferable that the surface of the board be formed of a material similar to the conventional whiteboard or finished in the same manner as the conventional whiteboard, but the surface of the board may be different from that of the conventional whiteboard as long as writing can be performed on it by using a pen.

Furthermore, it is also preferable that the board be not disposable and the handwriting produced on the board can be erased. It is preferable that the handwriting can be erased in the same manner as that of the conventional whiteboard; in other words, from the usability perspective, it is preferable that handwriting can be erased by lightly wiping the board by using an eraser, and if it is a small area, a user can wipe the area by using their hand and the handwriting can be erased. It is noted that handwriting here is a track of positions where a pen tip comes into contact with the board, or a trace that is left on the board by writing with a pen.

Furthermore, the pen of the handwriting input system is a writing instrument with which writing can be performed. It is preferable that ink similar to that of a marker pen for the conventional whiteboard be used for writing, but ink different from that of the marker pen for the conventional whiteboard may be used as long as it can be used for writing on the board, or a different principle may be employed for writing. It is noted that the different principle is not the one in which a board displays handwriting in accordance with the position of the pen tip such as the one using a display but the one in which the pen tip leaves visible handwriting at positions on the board where the pen tip comes into contact with the board.

Moreover, the pen tip is a portion that leaves visible handwriting when it comes into contact with the board. When the pen is a felt-tip pen similar to a conventional marker pen, the pen tip is the portion which comes into contact with the board and from which ink comes out and adheres to the board, that is, the exposed portion of a felt member impregnated with ink. Further, the identification signal is used for distinguishing a pen from other pens with different attributes. The identification signal may be used for distinguishing a pen from another object such as an eraser other than pens. The coordinate detection section detects the coordinates of a position where the pen tip comes into contact with the board, that is, position coordinates. The position coordinates are not detected if the pen tip is out of contact with the board, and therefore the position coordinates corresponding to handwriting can be detected.

Other preferable modes of the present disclosure are described below. (ii) The identification circuit may be disposed in an identification component that is attachable to and detachable from a body of the pen. With this configuration, by attaching the identification component corresponding to the attributes of the pen, the attributes of the pen can be associated with the identification signal and data of handwriting in accordance with the attributes of the pen can be generated. Further, if the identification component is attachable to a commercially available marker pen, a user can easily obtain a pen as a consumable item.

(iii) The identification signal may represent identification information for identifying at least one of a writing color of the pen, a size of the pen tip, and a shape of the pen tip. With this configuration, by attaching the identification component corresponding to at least one of the writing color, the size of the pen tip, and the shape of the pen tip, the identification signal can be associated with at least one of the color of the handwriting, the thickness of the line of the handwriting, and the shape of the line of the handwriting. Accordingly, the handwriting data in accordance with not only the coordinates of a position where the pen tip comes into contact with the board but also at least one of the color, the thickness of the line and the shape of the line can be generated.

(iv) The pen tip may be wholly or partially constituted by a dielectric or a metal object. The coordinate detection section may operate as a capacitance-type touch panel that is embedded in the board and detects a contact of the pen tip. The identification circuit may be a resonance circuit having a unique resonant frequency. The pen identification section may include a detection drive circuit that drives an induction coil embedded in the board and a detection circuit that detects resonance inducted in the resonance circuit by driving the induction coil. With this configuration, the capacitance-type touch panel detects the coordinates of a contact position of the pen tip, and a signal concerning a unique resonant frequency induced in the resonance circuit by driving the induction coil can be obtained as an identification signal.

The handwriting input system may include a controller that detects a resonant frequency of the resonance circuit by driving the induction coil at multiple frequencies by using the detection drive circuit and determining whether resonance occurs, that obtains predetermined identification information according to the resonant frequency, that obtains information of the position coordinates in accordance with a detection performed by the capacitance-type touch panel, and that generates handwriting data corresponding to the handwriting on the board in accordance with the identification information and the information of the position coordinates. With this configuration, the controller detects the resonant frequency of the resonance circuit and obtains predetermined identification information according to the resonant frequency. Subsequently, information of the coordinates of a position where the pen tip is in contact with the capacitance-type touch panel is obtained and the handwriting data in accordance with the obtained position coordinates and the identification information can be generated.

(vi) The identification circuit may be disposed at a position that is on a pen tip side with respect to a center of the pen and that is closer than the pen tip to the center of the pen and provide the identification signal corresponding to at least one attribute of a writing color of the pen, a size of the pen tip, and a shape of the pen tip. With this configuration, the identification signal associated with at least one of the color of the handwriting, the thickness of the line of the handwriting, and the shape of the line of the handwriting can be obtained from the identification circuit, and the handwriting data in accordance with not only the coordinates of the handwriting but also at least one of the color, the thickness of the line and the shape of the line can be generated. The center of the pen here is a position in the middle between one end of the pen where the pen tip is present and the opposite end of the pen and at the equal distance from the both ends.

The preferred modes of the present disclosure include any combination of the above-described modes. In addition to the above-described embodiments, various modified examples of the present disclosure may be considered. Those various modified examples are not considered to be not within the range of the present disclosure. All changes which come within the meaning and range of equivalency of the claims are embraced in the present disclosure.

The present disclosure contains subject matter related to that disclosed in Japanese Priority Patent Application JP 2017-148271 filed in the Japan Patent Office on Jul. 31, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A handwriting input system comprising:
a pen that serves as a writing instrument; and
a board that includes a writable area that is writable by the pen, wherein
the pen includes a pen tip that leaves visible handwriting on the board when the pen tip comes into contact with the board, an ink supply portion provides ink that attaches to the writable area and leaves visible handwriting on the board, and an identification circuit that provides an identification signal, and
the board includes a coordinate detection section that detects position coordinates of a position on the board where the pen tip is in contact with the board and a pen identification section that detects the identification signal in a contactless manner, wherein
the coordinate detecting section includes a plurality of electrodes and a loop switching circuit disposed in a close proximity to a surface of the board,
the pen identification section shares the plurality of electrodes with the coordinate detecting section, and
the loop switching circuit switches the plurality of electrodes between the coordinate detection section and the pen identification section.

2. The handwriting input system according to claim 1, wherein the identification circuit is disposed in an identification component that is attachable to and detachable from a body of the pen.

3. The handwriting input system according to claim 1, wherein the identification signal represents identification information for identifying at least one of a writing color of the pen, a size of the pen tip, and a shape of the pen tip.

4. The handwriting input system according to claim 1, wherein
the pen tip is wholly or partially constituted by a dielectric or a metal object,
the coordinate detection section operates as a capacitance-type touch panel that is embedded in the board and detects a contact of the pen tip,
the identification circuit is a resonance circuit having a unique resonant frequency, and
the pen identification section includes a detection drive circuit that drives an induction coil embedded in the board and a detection circuit that detects resonance inducted in the resonance circuit by driving the induction coil.

5. The handwriting input system according to claim 4, further comprising a controller that detects a resonant frequency of the resonance circuit by driving the induction coil at multiple frequencies by using the detection drive circuit and determining whether resonance occurs, that obtains predetermined identification information according to the resonant frequency, that obtains information of the position coordinates in accordance with a detection performed by the capacitance-type touch panel, and that generates handwriting data corresponding to the handwriting on the board in accordance with the identification information and the information of the position coordinates.

6. The handwriting input system according to claim 1, wherein the identification circuit is disposed at a position that is on a pen tip side with respect to a center of the pen and that is closer than the pen tip to the center of the pen and provides the identification signal corresponding to at least one attribute of a writing color the pen, a size of the pen tip, and a shape of the pen tip.

* * * * *